INVENTORS
HANS-GEORG ZIMMERMANN
ULRICH SCHALLER
BY Raymond P. Wallace

AGENT

United States Patent Office 3,405,694
Patented Oct. 15, 1968

3,405,694
ROTARY COMBUSTION ENGINE
Hans-Georg Zimmermann, Heilsbronn, and Ulrich Schaller, Mainz-Mombach, Germany, assignors to NSU Motorenwerke Aktiengesellschaft, Neckarsulm, Germany, and Wankel G.m.b.H., Lindau (Bodensee), Germany, both corporations
Filed Dec. 9, 1966, Ser. No. 600,575
2 Claims. (Cl. 123—8)

ABSTRACT OF THE DISCLOSURE

In a rotary combustion engine the rotor is cooled and the bearings lubricated by double intakes for fuel-air-oil mixture, part of the fresh gas mixture passing over the rotor working faces and part into the hollow interior of the rotor.

---

Figure 1:
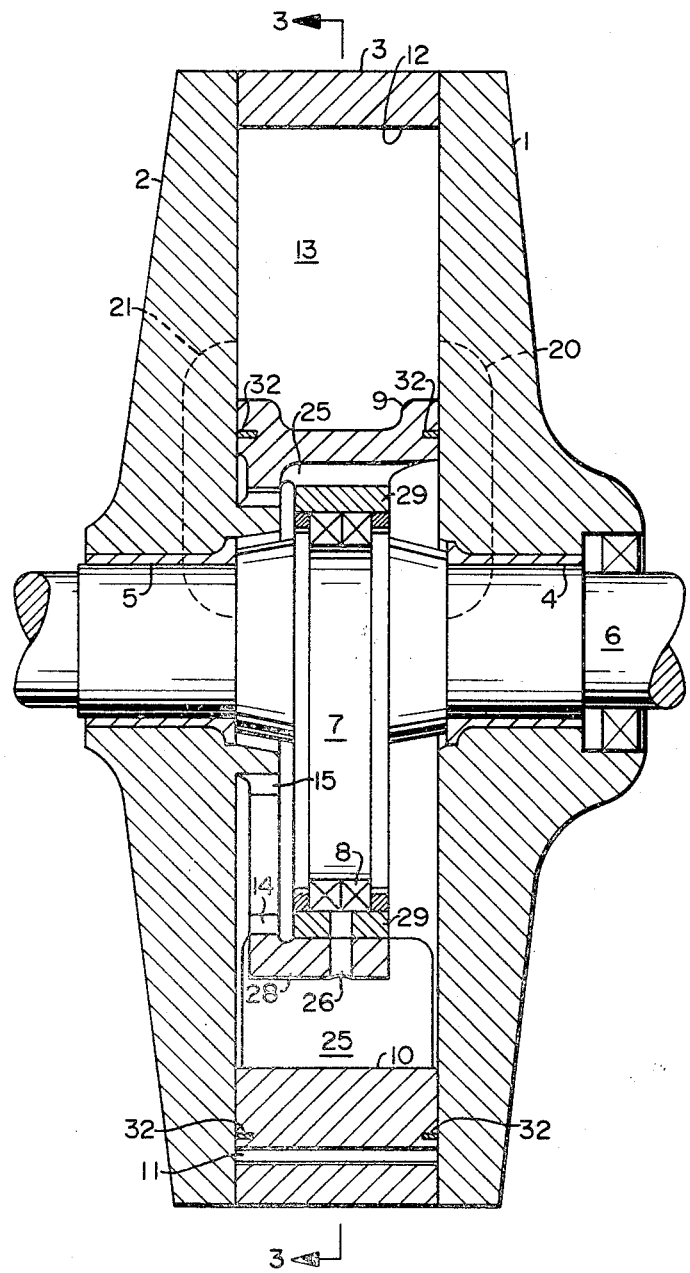

This invention relates to cooling the rotor and lubricating the bearings of a rotary internal combustion engine of the trochoidal type, having a housing comprising a peripheral wall with a multilobed surface of epitrochoidal profile and a pair of end walls to form an engine cavity. Transpiercing the end walls along the axis of the cavity is a shaft having an eccentric portion disposed within the cavity, with a generally polygonal multiapexed rotor mounted on the eccentric portion and rotatable therearound to define with the housing a plurality of variable-volume working chambers. The rotor is cooled by fresh fuel-air-oil mixture inducted into the engine and flowing over and into the hollow rotor, and a portion of the oil component of the fresh gas condenses within the rotor and is led to the bearings.

In similar engines of the prior art, such as that described in Patent No. 3,180,323, the inducted fresh mixture is conducted through a channel disposed in one end wall, through passages in the rotor, and then through a bypass channel in the opposite end wall into the inducting working chamber. With such an arrangement the fuel-air-oil mixture flowing through the rotor is responsible for cooling the rotor and for lubricating the bearings of the rotor and shaft. Such a prior art device has the disadvantage that in flowing through the rotor the mixture becomes greatly heated, and in addition it is throttled by the various passages and their complexity. For these reasons, the volumetric efficiency of the engine, and thus the effective power output, are greatly impaired.

In the present invention this drawback is avoided by disposing a gas intake channel in each of the end walls, communicating with end wall recesses which extend partially within the working chambers and partially within the inner envelope of the rotor end seals, whereby the fresh gases flow not only into the hollow rotor but also over its working faces and over its ends adjacent to the working faces.

With this arrangement of intake, the fresh gases no longer flow through the rotor before entering the working chamber, and the previous throttling losses are thereby avoided. On the contrary the fresh intake flows from the end wall recesses disposed on both sides of the rotor over its faces and then directly into the working chamber.

In this connection it is advantageous, in the case of trochoidal engines having a two-lobed peripheral inner surface and a three-apexed rotor, to form the end wall recesses in such a manner that they extend inwardly to an area within the inner envelope of the rotor end seals in the region of the minor diameter of the epitrochoid.

For the purpose of improving bearing lubrication, it is furthermore advantageous to make the rotor hollow and open toward the end walls, with the hollow interior of the rotor divided into a plurality of cavities by generally radially extending partitions that serve as oil-catching surfaces. Each of these individual cavities communicates with a passage or bore through the piston hub leading to the bearing. That portion of the inducted fuel-air-oil mixture which is delivered to the interior of the rotor strikes the partitions or webs, on which the oil is partially condensed or deposited, and because of the eccentric motion of the rotor, during the deceleration phase of motion the oil is impelled through the passages to the bearing for lubrication.

It is therefore an object of this invention to provide a method and apparatus for cooling the rotor of a trochoidal engine.

It is another object to provide a method and apparatus for rotor cooling by means of inducted fuel mixture without deleterious throttling effects.

A further object is to provide a simple means of bearing lubrication for the rotor of a trochoidal engine.

Figure 2:
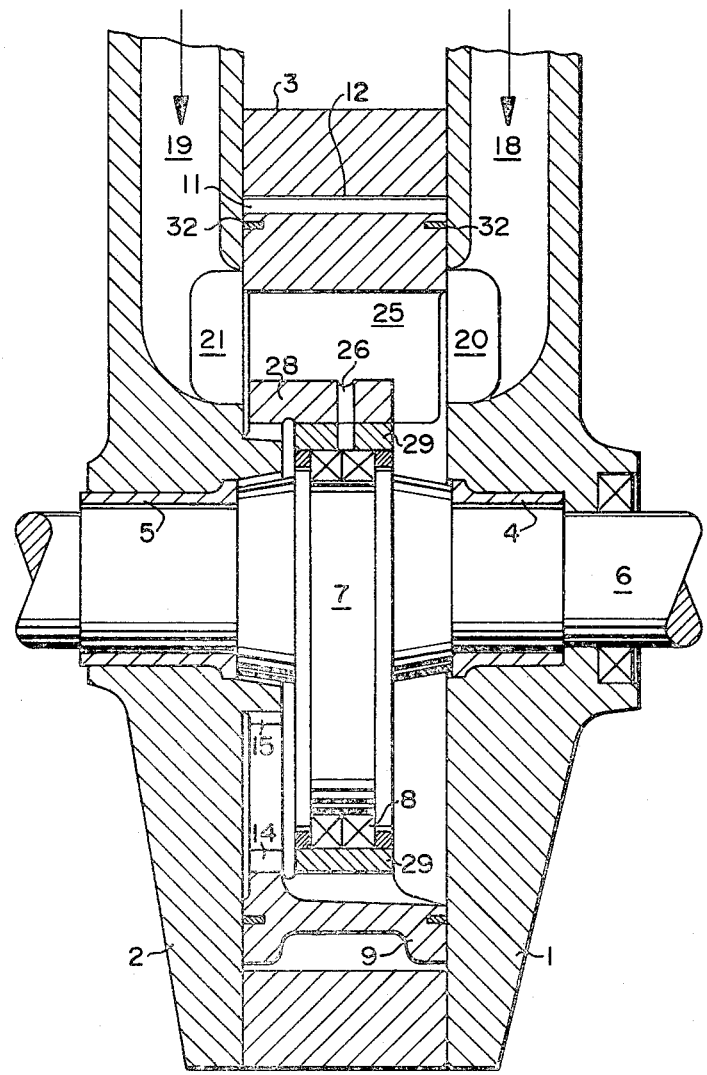
Figure 3:
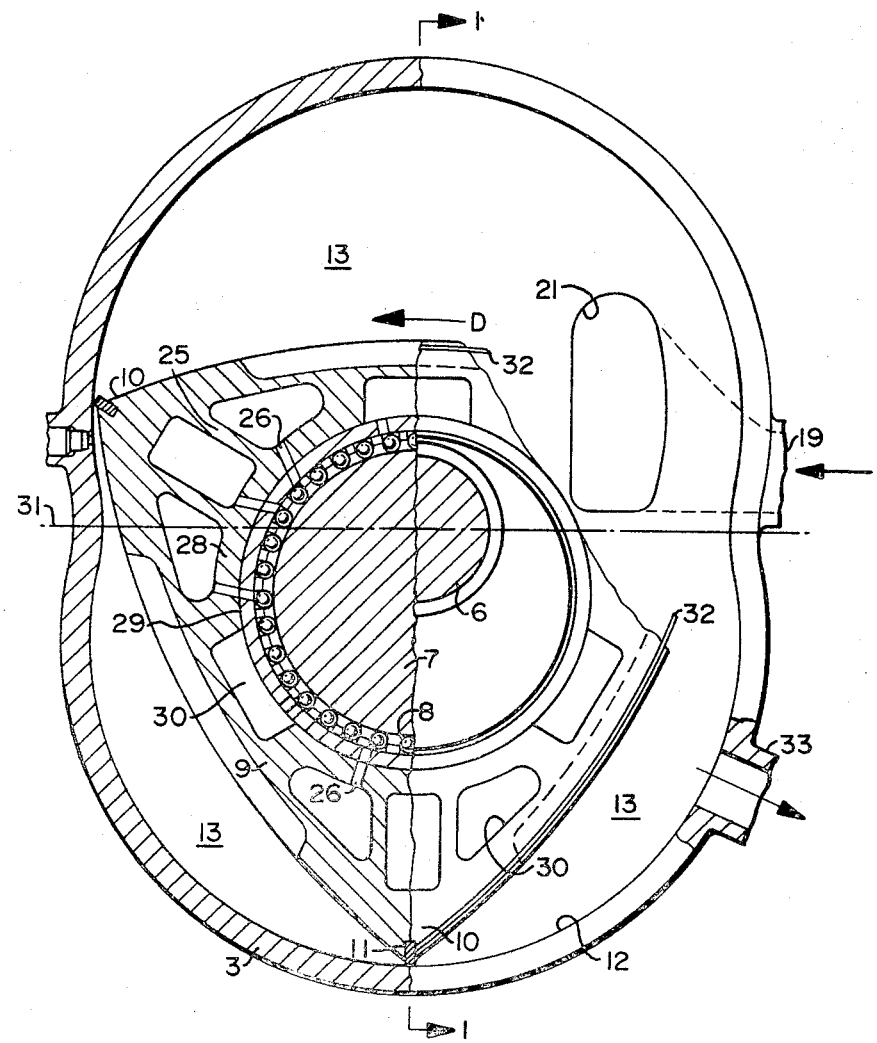

These objects and advantages and others ancillary thereto will be readily understood on reading the following specification in connection with the appended drawings, in which FIG. 1 is an elevation in cross-section of an engine embodying the invention, taken along line 1—1 of FIG. 3;

FIG. 2 is a similar view to FIG. 1, but taken along the minor diameter of the epitrochoid, with the rotor rotated to a different position; and FIG. 3 is a view along the line 3—3 of FIG. 1, with the rotor partially in cross-section and partially fragmented.

The housing or outer body of the rotary engine comprises the two end walls 1 and 2 and the peripheral wall 3 which spaces them apart. Bearings 4 and 5 are disposed in the end walls, journaling a shaft 6 having an eccentric 7 disposed within the cavity of the housing. The eccentric is surrounded by a bearing 8 on which is rotatably mounted the motor or inner body 9. The rotor has a polygonal profile, and in the embodiment shown is of generally triangular form, having three apexes 10. Each apex has an axially parallel slot in which is disposed a radially movable seal strip 11; apex seals 11 continuously sweep the two-lobed inner surface 12 of the peripheral shell 3. Thus there are formed three variable-volume working chambers 13, in each of which take place, with suitable phase displacement, the four cycles of induction, compression, expansion, and exhaust. One end wall bears a fixed gear 15 surrounding the shaft, in mesh with a ring gear 14 borne by the rotor, to assist in maintaining phase between the rotor and shaft, which in the example illustrated is in the ratio of 1:3. End wall 1 is provided with a gas inlet channel 18, and end wall 2 has a similar intake channel 19. These intake channels have their orifices in recesses 20 and 21, respectively, in the inner surfaces of the end walls. An exhaust passage 33 is provided in the peripheral wall.

Rotor 9 is hollow, having its ends open toward the end walls 1 and 2. The interior of the rotor is divided by radially extending partitions 25 into a plurality of individual cavities 30 circumferentially spaced around the hub portion 28. These partition walls 25 serve as oil-catching surfaces. Each cavity 30 has communicating with it a bore or passage 26 through the rotor hub 28 and the bearing sleeve 29 to the rotor bearing 8. Each passage 26 opens into its associated rotor cavity at the leading portion of the cavity in the direction of rotor rotation, shown by the arrow D.

During operation of the engine, fresh gas mixture flows through the two intake channels 18 and 19 into their delivery recesses 20 and 21. It will be observed that the delivery recesses 20 and 21 in the end walls extend close to the region of the minor diameter of the epitrochoid, shown by the centerline 31. Thus, a portion of each recess is located in the area of the inner envelope curve of the gas seals 32, which are borne by each end face of the rotor in grooves generally parallel to the working faces and adjacent thereto. The inner envelope curve of the gas seals is that area, as projected on the end wall, within which no portion of the gas seals ever encroaches in their path of travel. In a two-lobed epitrochoidal engine with a three-apexed rotor it is a quasi-elliptical area with pointed ends, with its major diameter lying along the minor diameter of the epitrochoid.

Since the delivery recesses have a portion of their open sides disposed within the inner envelope curve of the gas seals, some part of the intake of fresh gas will always be delivered to the hollow interior of the rotor. In the rotor cavities 30 a portion of the oil mixed with the fuel condenses on walls or partitions 25. Because of the eccentric motion of the rotor in planetating around the axis of shaft 6, during the deceleration phases of motion the condensed oil is conveyed through passages 26 to the rotor bearing 8 for lubrication.

The remainder of the inducted fresh gas is delivered at the edge of the rotor face, and passes across the face into the working chamber 13. Such an intake of fresh gas flowing across the rotor faces serves to cool the rotor, without the prior art disadvantage of throttling caused by passing through the rotor itself.

Although the invention has been described above in a preferred embodiment, it will be understood by those skilled in the art that various changes and modifications may be made without departing from the scope of the invention. It is intended to cover all such modifications in the appended claims.

What is claimed is:

1. A rotary internal combustion engine having a housing comprising a peripheral wall and a pair of end walls defining an engine cavity, a shaft transpiercing the end walls on the longitudinal axis of the engine cavity and having an eccentric portion disposed therein, a generally polygonal rotor rotatably mounted on a bearing surrounding the eccentric and having a plurality of apexes with a working face extending between each pair of adjacent apexes, the rotor having end faces adjacent to the end walls and defining with the housing a plurality of variable-volume working chambers, each of the rotor end faces having gas seals adjacent to the rotor periphery which sweep the end walls in sealing relation thereto, wherein the improvement comprises intake passage means for fuel-air-oil gas mixture in each of the end walls, a recess in each of the end walls facing the rotor end faces and communicating with the intake passage means, the radially inward portion of each of the recesses being disposed within the inner envelope curve of the gas seals and the radially outward portion of each of the recesses being disposed outside the inner envelope and in communication with a working chamber, the rotor having a hollow interior having therein a plurality of radially extending partitions defining a plurality of internal rotor cavities, the rotor cavities being open at the end faces and communicating serially with the recesses during rotation, each of the rotor cavities having passage means communicating with the rotor bearing, whereby during operation a portion of the inducted fuel-air-oil gas mixture is delivered from the radially outer portions of the recesses directly into the inducting working chamber across the rotor face to cool the same, and another portion of the mixture is delivered from the radially inner portions of the recesses into the rotor cavities where at least a part of the oil fraction condenses on the internal partitions and is delivered through the rotor passages to the rotor bearing.

2. The combination recited in claim 1, wherein said rotor passage means are bores through the hub portion of said rotor disposed in each of said cavities at the leading portion of said cavity in the direction of rotor rotation, whereby during the deceleration phases of rotor motion the condensed oil fraction flows through the rotor passages to the rotor bearing.

References Cited
UNITED STATES PATENTS 3,180,323   4/1965   Paschke _____ 123—8

RALPH D. BLAKESLEE, *Primary Examiner.*